(12) United States Patent
Akers et al.

(10) Patent No.: US 7,275,863 B1
(45) Date of Patent: Oct. 2, 2007

(54) THRESHOLD CALORIMETER/SHELF LIFE MONITOR

(75) Inventors: Jeffrey W. Akers, Columbia, MO (US); James Michael Zerkus, Houston, TX (US)

(73) Assignee: Time Temperature Integration, Inc., Kennebunk, ME (US)

( * ) Notice: Subject to any disclaimer, the term of this patent is extended or adjusted under 35 U.S.C. 154(b) by 463 days.

(21) Appl. No.: 11/006,431

(22) Filed: Dec. 6, 2004

Related U.S. Application Data

(60) Provisional application No. 60/527,104, filed on Dec. 4, 2003.

(51) Int. Cl.
*G01K 3/00* (2006.01)
(52) U.S. Cl. .................. 374/102; 374/104; 236/94; 62/129; 116/216
(58) Field of Classification Search .............. 374/31, 374/32, 102, 104, 107, 187, 190; 236/94; 62/129; 116/216
See application file for complete search history.

(56) References Cited

U.S. PATENT DOCUMENTS 6,848,390 B2 * 2/2005 Akers et al. ............. 116/216

* cited by examiner

*Primary Examiner*—Marc Norman
(74) *Attorney, Agent, or Firm*—Kenneth A. Roddy

(57) ABSTRACT

Threshold calorimeter/shelf life monitors having a thermally moderating housing containing a liquid solution and one or more low melting point solids all having properties correlated relative to one another and calibrated to closely match a thermal decay profile (time-temperature profile) of a perishable product being monitored and indicate, by a change in color, electrical capacitance and/or impedance, transmitted RF signals, or combination thereof, the cumulative thermal history of the product while in transit or storage and whether its time-temperature profile has been violated to a detrimental extent or if a significant amount of shelf life has been consumed.

14 Claims, 3 Drawing Sheets

THRESHOLD CALORIMETER/SHELF LIFE MONITOR

CROSS REFERENCE TO RELATED APPLICATION

This application claims priority of U.S. Provisional Application Ser. No. 60/527,104, filed Dec. 4, 2003, the pendency of which is extended until Dec. 6, 2004 under 35 U.S.C. 119(e)(3).

BACKGROUND OF THE INVENTION

1. Field of the Invention

This invention relates generally to time-temperature integrating indicator devices and thermal exposure monitors, and more particularly to threshold calorimeter/shelf life monitors having a thermally moderating housing containing a liquid solution and one or more low melting point solids all correlated relative to one another and calibrated to closely match a thermal decay profile (time-temperature profile) of a perishable product being monitored and indicate, by a change in color, electrical capacitance and/or impedance, transmitted RF signals, or combination thereof, the cumulative thermal history of the product while in transit or storage and whether its time-temperature profile has been violated to a detrimental extent or if a significant amount of shelf life has been consumed.

2. Background Art

As used herein, "product" or "perishable product" is the thing or medium that is being monitored and may include food products, non-food products, medical products, drugs, research reagents, pharmaceuticals, human organs, tissues, or other substance or device that may be subject to deterioration upon exposure to thermal differences over time, or the product package. "Temperature" of the product is the measurement of the average energy of its molecules. "Heat energy" is a function of time and temperature difference. "Absorbed Heat" in a product is the total kinetic energy of its molecules. "Specific heat" is the quantity of heat needed to raise the temperature of one gram of a substance one degree Celsius. "Heat of fusion" is the quantity of heat needed to change one gram of a solid into a liquid at a constant temperature. "Heat of solution" is the amount of energy (heat) given off (or absorbed) in the dissolving of a solid into a liquid. "Melting point" is the temperature at which a solid substance changes to a liquid state. "Solubility" is the ability of a substance to form a solution with another substance. "Dissolution" is the ability of one substance to become part of another substance.

"Threshold temperature" is the temperature at which deterioration of a product begins or substantially increases based on a time and temperature thermal deterioration profile of that particular product. "Preferred storage temperature range" is a known practical temperature range within which a product must be maintained to minimize deterioration. "Thermal capacity" is defined as the product of specific heat, volume and density of a material. "Thermal conductivity" is the amount of heat energy conducted through a cubic meter of a material per second when the temperature difference between opposite faces of the cube is one degree Celsius. "Cold Soak" is exposure of a device to a temperature for an amount of time sufficient for the entire device to be uniform at the exposure temperature.

A "temperature sensitive" product does not decay or become spoiled as a result of exposure to a given temperature; instead, it spoils due to the amount of heat imparted to it as a result of a temperature difference over time. In other words, a given product, such as a food product or produce, can safely tolerate short exposures to an elevated temperature, but not long exposures. Thus, prior art devices that merely indicate that a temperature threshold was achieved or exceeded at some point in time do not indicate the cumulative amount of heat energy absorbed within a preferred storage temperature range and whether, at any time, the cumulative heat energy absorbed has taken place for a period of time sufficient to cause any degree of deterioration based on the time and temperature thermal deterioration profile of the perishable product.

It is of utmost importance to maintain processed produce such as food products and perishable non-food products such as medical products, drugs, research reagents, pharmaceuticals, human organs and tissues, etc., within a predetermined temperature range and to determine whether such products may have been exposed to detrimental temperatures outside of a specified temperature range over time during some step in the chain of distribution from the source to the destination.

The demand for processed produce and perishable non-food products has pushed the limits of the distribution systems of the perishable products industry to maintain an unbroken temperature controlled chain from field to consumer and industry. Many segments of the food industry utilize a Hazard Analysis and Critical Control Point system (HACCP), which is a world-recognized, common sense approach to food safety and prevention of food contamination.

The HACCP has outlined seven principles for food safety and prevention of food contamination: (1) Conduct a hazard analysis to identify potential hazards that could occur in the food production process; (2) Identify the critical control points (CCPs)—those points in the process where the potential hazards could occur and can be prevented and/or controlled; (3) Establish critical limits for preventive measures associated with each CCP; (4) Monitor each CCP to ensure it stays within the limits; (5) Take corrective actions when monitoring determines a CCP is not within the established limits; (6) Keep records that document the HACCP system is monitored and working correctly; and (7) Verify that the HACCP system is working properly through tests and other measures.

Existing HACCP programs in place at the processing end of the chain are not equipped with proper tools to monitor all of the critical control points (CCP's) in the cold chain, and temperature related problems can still occur throughout the distribution chain. Thus, there is a need for a device that can be used for economically monitoring the links in the cold chain, especially when perishable loads are broken up and re-distributed.

Time-temperature integrating indicator devices and thermal exposure monitors are known in the art, most of which rely on diffusion with respect to temperature, the rate of reaction of chemical components with respect to temperature, enzymatic reactions with respect to temperature, or viscosity with respect to temperature, to produce a response emulating a given thermal deterioration profile. Indicating devices utilizing radio frequency (RF) transponder technology are also known in the art, which receive an incoming interrogation signal and respond thereto by generating and transmitting an outgoing responsive signal which is modulated or otherwise encoded so as to uniquely identify or label the particular object to which the transponder element is affixed.

Our previous U.S. Pat. No. 6,425,343 and pending application Ser. No. 10/201,385 and Ser. No. 10/816,974, which are hereby incorporated by reference herein in their entirety, disclose cumulative thermal exposure monitors that utilize shape memory alloy technology. These devices have a have a thermally-conductive housing adapted to be placed in close proximity to a product to be monitored and at least one thermally-responsive shape memory alloy member in the housing that has a first shape at temperatures below a critical temperature and a second shape at temperatures above the critical temperature and a transformation temperature range encompassing a prescribed time-temperature profile which is determined by the detrimental temperature related to the product being monitored. A visual indicator associated with the thermally-responsive member is moved from an initial position as the thermally-responsive member changes from the first shape to the second shape to visually indicate whether the product being monitored has been exposed to temperatures above the prescribed detrimental temperature for a period of time that would be detrimental to the product. The data may also be retrieved remotely via RF transponder technology without directly viewing the monitor device. The present invention differs in structure and operation from the previous patents and applications.

Spevacek, U.S. Pat. No. 6,614,728 discloses a time-temperature integrating indicator having an amorphous material in operable contact with a porous matrix, wherein the amorphous material only migrates into the porous matrix at or above a predetermined temperature. Use of the invention simplifies monitoring of the cumulative temperature exposure of the product because no additional actuation step is required. The indicator is especially useful in monitoring the cumulative time-temperature exposure of a perishable product for a short period of time at an abusive temperature.

Qiu, et al, U.S. Pat. No. 6,435,128 discloses a time-temperature indicator device that provides a visually observable indication of the cumulative thermal exposure of an object. The device includes a substrate having a diffusely light-reflective porous matrix and a backing. The backing includes on its surface a viscoelastic indicator material for contacting the substrate and a barrier material for substantially inhibiting the lateral and longitudinal flow of viscoelastic indicator material between the substrate and the backing.

Prusik, et al, U.S. Pat. No. 6,544,925 discloses an activatable time-temperature indicator system useful in tracking the thermal exposure history of a temperature-sensitive perishable product and providing a visually-distinct signal, such as a change in color density, at the expiration of a predetermined time-temperature integral comprises a first element, such as a direct thermal printing label, comprising a composition having at least a first co-reactant of a color-forming reaction. A second, activator element, such as an adhesive tab capable of being affixed to the label element, comprises an activator component, such as a second co-reactant of the color-forming reaction or a solubilizing agent for prompting the interaction of the co-reactants of the label composition. The activator tab element is affixed to the label composition to activate for reaction at ambient conditions the normally high-temperature color-forming composition of the label at about the same time as the label is affixed to the perishable product. Such an ability to effect the initiation of the indicator reaction at a given time eliminates any unknown, premature color formation in the indicator system to thereby ensure a true time-temperature history of the perishable product.

Roth, U.S. Pat. No. 6,524,000 discloses time-temperature indicators activated with direct thermal printing and methods for their production. Recording materials are converted in a direct thermal imaging apparatus to time temperature indicators by exposure to heat from the thermal print head of a direct thermal printer. Methods for converting a recording material to a time temperature indicator comprise heating the recording material with a direct thermal imaging apparatus. The recording material contains an indicator compound which is convertible from an inactive state to an active state when heat is applied thereto by a direct thermal imaging apparatus for less than one second. Time-temperature indicators with active indicator compounds in a printed pattern are formed by a direct thermal imaging apparatus.

Prusik, et al, U.S. Pat. No. 6,042,264 discloses a time-temperature indicator label for measuring the length of time to which a product has been exposed to a temperature above a pre-determined temperature. The period of time of exposure is integrated with the temperature to which the indicator is exposed. The label is a composite of a plurality of layers adapted to be adhered at its underside to a product container. The label includes a printable surface layer, a longitudinal wicking strip that is adhered underneath the surface layer substantially at the opposite extremities only of the wicking strip and a lower substrate layer forming an envelope with said surface layer. A heat-fusible substance, which melts and flows above a pre-determined temperature, is applied on the surface of the wicking strip contiguous to at least one of the ends of the wicking member. When the heat-fusible substance is exposed to a temperature above the pre-determined temperature, the heat-fusible substance flows along the length of the wicking member. The label has a printable surface layer and is sealed at its peripheral edge to the peripheral edge of the substrate layer. These layers encapsulate the wicking member and the heat-fusible substance. The surface layer is provided with a sight window at an intermediate location over the wicking member through which the progress of flow on the wicking member is observed.

Ezrielev, et al, U.S. Pat. No. 5,476,792 discloses a time-temperature indicator device for recording the duration of time over which a temperature has been established above a predetermined temperature, which includes a dye-compatible polymer composition having a softening point above the predetermined temperature and a polymer-compatible dye composition in contact with the polymer composition and present in a quantity with respect to the polymer composition sufficient for diffusion through the polymer composition whenever the polymer composition is above the predetermined temperature. The quantity is selected so that the extent of diffusion corresponds to the duration of exposure above the predetermined temperature relative to the total time required for substantially complete diffusion. Articles for which a heat history above a predetermined temperature is to be recorded, in combination with the disclosed time-temperature indicator devices are also described. Methods for recording a duration of time over which a temperature has been established above a predetermined temperature utilizing the disclosed time-temperature indicator devices are also discussed.

Patel, U.S. Pat. No. 5,254,473 discloses an indicator composition and process capable of changing color in relationship to its exposure to a temperature above and below a base line temperature and to the time of said exposure, for monitoring the time-temperature history of a substrate, depositable as a layer on said substrate, comprising a dispersion of either a binder comprising a reaction inert, neutral finely divided absorbent, in the presence of a reactant comprising a salt of an acid or an organic compound substituted by at least one moiety which, in ionic form, is an anion or a binder/reactant, comprising at least one solid organic polymer whose constituent units contain, as a covalent substituent, at least one moiety which, in ionic form, is an anion; as indicator, at least one acid sensitive pH dye and as activator, at least one base. This composition and process may be utilized to form a solid state device for monitoring integral values of time and temperature during storage of perishables. The device is a single solid indicating layer deposited upon a substrate. The time required for the color change and the activation energy of the device can be varied by varying the concentration and nature of reactants, catalysts, additives and polymeric binder/reactant matrix. The color change can be gradual or abrupt and exhibited as a continuous strip, as alphanumeric symbol(s) or as a line array that can be read by a bar code reader.

Jalinski, U.S. Pat. No. 5,182,212 discloses a new and improved integrating indicator system operable to signal the attainment of one or more preselected time-temperature integrals which monitor the temperature and time history of a product utilizing a dual system of specific reaction pairs which simultaneously generate acid and alkali from two neutral substrates. One of the substrates is present in excess of the other. The preferred dynamic indicator system generates a constant pH buffer in the alkali range that is maintained until one of the substrates is depleted. At that time, a rapid pH change in the indicator solution to the acid range occurs, resulting in a very sharp visual color change in a pH-sensitive dye. In preferred embodiments, the specific reaction pairs are enzyme/substrate pairs, preferably urease/urea and yeast/triacetin. A preferred combination pH-sensitive dye package includes m-nitrophenol, p-nitrophenol and litmus to provide an indicator which changes from green to reddish pink upon the expiration of a given amount of time at constant temperature, or in a shorter period of time, upon exposure to elevated abuse temperatures. In especially preferred embodiments, one of the enzyme substrate pairs includes an enzyme component provided by a microorganism which has been shock treated prior to incorporation in the indicator to improve temperature sensitivity and provide extended half life. The new and improved integratin indicators are adapted for use with packaged foodstuffs intended for refrigerated and room temperature handling and storage at temperatures between about 20° F. to about 120° F.

Patel, U.S. Pat. No. 5,053,339 discloses a color changing device for monitoring the time-temperature storage history, i.e. shelf life, of perishable products. The device is constructed of an activator tape, containing an activator composition matrix, an indicating tape, containing an indicating composition matrix and an optional barrier matrix between the activator tape and the indicating tape. At least one matrix is a pressure sensitive adhesive. The activating composition, e.g. an organic acid such as citric acid, diffuses through the barrier and/or indicating matrix to continuously contact the indicating composition, e.g. an acid-base dye indicator such as 2,2,4,4',4",-pentamethoxy triphenylmethanol, to produce a visually observable color change at the temperature being monitored. The color intensifies with time and temperature, as more activator composition diffuses into the indicating matrix. The matrices are water-impermeable and the device preferably possesses activation energy and rate constant values for the color change, which are substantially the same as those for product decay. This allows accurate and continuously observable monitoring of the available shelf-life of the perishable product to which the device is adhered to.

Patel, U.S. Pat. No. 5,045,283 discloses a moving boundary device for monitoring the time-temperature storage history, i.e. shelf life, of perishable products. The device is constructed of an activator tape, containing an activator composition in an activator matrix, an indicating tape, containing an indicating composition in an indicator matrix in which the matrices are adhered together to form a wedge-shaped composite matrix, preferably by means of a pressure sensitive adhesive. The device operates by allowing the activating composition, e.g. an organic acid such as citric acid, to diffuse through the increasingly thicker composite matrix to continuously contact the indicating composition, e.g. an acid-base dye indicator such as 2,2',4,4',4",-pentamethoxy triphenylmethanol, to produce a visually observable color change at the temperature being monitored. The color change appears as a moving boundary at the color/non-color interface which moves transversely along the length of the device toward the thicker end of the composite matrix. The matrices are water-impermeable and the device preferably possesses activation energy and rate constant values for the color change which are substantially the same as those for product decay. This allows accurate and continuously observable monitoring of the available shelf-life of the perishable product to which the device is adhered.

Preziosi, et al, U.S. Pat. No. 4,892,677 discloses a process for producing articles (defrost indicators) useful for monitoring the time-temperature history of perishable items. The process initially involves forming a solution comprised of a diacetylenic monomer and a solvent. The solution is frozen, and the frozen solution having crystalline diacetylenic monomer therein is irradiated to partially polymerize the diacetylenic monomer. Partial polymerization of the crystalline diacetylenic monomer admixed with frozen solvent results in the production of a novel article of manufacture having color. The novel article of manufacture is comprised of frozen solvent, diacetylenic monomer, and colored polydiacetylene. Due to the intensity of the color of the polydiacetylene, the entire article of manufacture appears to be colored. The colored article of manufacture may be attached to various perishables to monitor the shelf life of the perishables. upon exposure to temperatures above a critical temperature, the frozen solvent melts and extracts unreached monomer from the colored polymer, thereby causing a sharp color transition which indicates that the perishable should possibly be discarded.

Bradley, U.S. Pat. No. 4,292,916 discloses disposable timer and product storage condition tape indicator in which components of a carrier mixture react physically and/or chemically with one or more receptive layers. The carrier mixture and receptive layers are so comprised as to react during a given time interval, the interval being dependent upon and constantly modified by such external physical conditions as temperature, moisture, light, radiation, or pressure. During the timing period the device can either give a changing color display which is matched in rate to the declining freshness of a food or medicine in a container to which the device is attached or can cause the appearance or disappearance of words or symbols or sticky areas or odors. A variety of means for activating the timer are possible.

Kydonieus, et al, U.S. Pat. No. 4,212,153 discloses a laminated time color indicator which changes in a visually perceptible mode with the passage of time and a method for making such an indicator. At least two layers are provided whereby the molecular migration of an agent in an interior layer to the outermost surface of the exterior layer causes a change which can be visually perceived, e.g., a change in color or shade. Preferred embodiments include the migration of a dye or the migration of an acid or base wherein the outermost layer has the other member of an acid-base pair and a pH indicator.

Giezen, et al, U.S. Pat. No. 4,154,107 discloses a time temperature device utilizing an activator acid in a pressure sensitive adhesive which migrates to contact an organic dye to produce an aqueous-mediated color change. The preferred device also requires an absorbent paper element to contain the indicator and a wetting agent to retain water to introduce color change. The activating and indicating components used in the device are water-soluble and hence the performance of the device is adversely affected by moisture and humidity. In order to protect the device, an enveloping plastic film is employed.

Witonsky, U.S. Pat. No. 3,942,467 discloses a system operable to signal the attainment of one or more preselected time-temperature integrals which monitor the temperature history of a product utilizes an organic compound which is subject to solvolysis with the generation of an acid, at least one base in an amount less than the stoichiometric equivalent of the acid generated, and a pH sensitive indicator.

Myers, U.S. Pat. No. 3,520,124 discloses a device that indicates a predetermined time interval based on two or more materials that react, either chemically or physically over a predetermined period to produce a termination signal. The reacting materials are carried on a base member and are separated by a barrier preventing contact. Upon elimination of the barrier, a commencement signal is produced indicating the time reaction is underway.

Transponder or transceiver type identification systems are also known in the art, and generally are capable of receiving an incoming interrogation signal and responding thereto by generating and transmitting an outgoing responsive signal. The outgoing responsive signal, in turn, is modulated or otherwise encoded so as to uniquely identify or label the particular object to which the transponder element is affixed.

Blama, U.S. Pat. RE 37,956, which is hereby incorporated by reference herein in its entirety, discloses a method and apparatus for identifying an item to or with which a radio frequency identification tag is attached or associated. The tag is made of a nonconductive material having a flat surface on which a plurality of circuits are pressed, stamped, etched or otherwise positioned. Each circuit has a capacitance and an inductance. The capacitance is formed from the capacitive value of a single capacitor. The inductance is formed from the inductive value of a single inductor coil having two conductive ends each connected to the capacitor. Each tag is associated with a binary number established from a pattern of binary ones and zeros, which depend on the resonance, or nonresonance of each circuit, respectively, and the circuits position with respect to the binary table. The binary number may be converted to a decimal number using a binary table for conversion.

Mehregany, et al, U.S. Pat. No. 5,712,609, which is hereby incorporated by reference herein in its entirety, discloses a micromechanical memory sensor. The sensor comprises a latch member mechanically latching upon detection of a threshold value of a variable condition and circuitry for detecting such latching. The sensor further includes a resetting mechanism for electrically unlatching the latch member whereby the sensor latched purely mechanically is electrically reset for repeat use. The sensor is capable of maximum temperature measurement (polling) by an external RF signal provided by a "reader", the transponder transmits tire identification and tire pressure data in digitally-coded form. The transponder is "passive" in that it is not self-powered, but rather obtains its operating power from the externally-provided RF signal. The tire has two spaced beads, each including an annular tensile member of wound or cabled steel wire. The transponder antenna is positioned adjacent one of the annular tensile members for electric or magnetic field coupling to the annular tensile member.

Geschke, et al, U.S. Pat. No. 5,661,651, which is hereby incorporated by reference herein in its entirety, discloses a wireless system for monitoring vehicle parameters, such as tire pressure, using radio frequency (RF) signals transmitted from transmitters close in proximity to an associated parameter sensor, to a centrally located receiver. The transmitted RF signals from the transmitters may be distinguished by the frequency of the respective transmitted RF signals. To detect the presence of an RF signal having a particular frequency, the wireless vehicle parameter monitoring system of one embodiment includes a digitally controlled tuner or a plurality of parallel bandpass filters, which pass different ranges of frequencies corresponding to the frequencies of the RF signals output from the transmitters. In this manner, RF signals transmitted from different tires may be distinguished based upon the frequency of the transmitted signal. The receiver of this system may be implemented in the receiver of a trainable transmitter such that a dedicated receiver need not be provided.

Schuermann, U.S. Pat. No. 5,451,959, which is hereby incorporated by reference herein in its entirety, discloses a transponder system comprising an interrogation unit for communicating with a plurality of responder units. The responder unit contains a parallel resonant circuit having a coil and a capacitor for reception of a RF interrogation pulse. Connected to the parallel resonant circuit is a capacitor serving as an energy accumulator. A processor may be provided for receiving input signals from a sensor which responds to physical parameters in the environment of the responder unit, for example to the ambient temperature, the ambient pressure or the like. The sensor could for example be an air-pressure sensitive sensor. In this case the responder unit can be installed in the carcass of a vehicle pneumatic tire and, with the aid of an interrogation unit contained in the vehicle, it is possible to continuously monitor the air pressure in the tire.

Dunn, et al, U.S. Pat. No. 4,911,217, which is hereby incorporated by reference herein in its entirety, discloses a combination pneumatic tire and integrated circuit transponder for tire identification wherein the transponder has two electrodes, a first of which is positioned such that the average spacing of the first electrode's surface from one of the tire's steel reinforcing components, such as an annular tensile member in its bead or a steel-reinforced ply, is substantially less than the average spacing of the second electrode's surface from the reinforcing component. The transponder located within the tire structure is capable of transmitting an identifying digital signal in response to interrogation by an R/F electric field emanating from outside the tire.

Carroll, U.S. Pat. No. 4,857,893, which is hereby incorporated by reference herein in its entirety, discloses a transponder device that receives a carrier signal from an interrogator unit which is rectified by a rectifying circuit in order to generate operating power. Logic/timing circuits derive a clock signal and second carrier signal from the received carrier signal. This clock signal reads a unique identifying data word from a programmable read only memory (PROM). The data word is encoded and mixed with the carrier signal in a balanced modulator circuit. The output of the balanced modulator is transmitted to the interrogator unit where it is decoded and used as an identifying signal. The identifying signal identifies the particular transponder device from which it originated. The rectifier and balanced modulator circuits are realized from the same diode elements. All electrical circuits of the transponder device are realized on the same monolithic semiconductor chip, and in one embodiment, an antenna receiving/transmitting coil is also part of the chip, being placed around the periphery thereof.

Galasko, et al, U.S. Pat. No. 4,578,992, which is hereby incorporated by reference herein in its entirety, discloses a tire pressure indicating device including a coil and a pressure-sensitive capacitor forming a passive oscillatory circuit having a natural resonant frequency which varies with tire pressure due to changes caused to the capacitance value of the capacitor. The circuit is energized by pulses supplied by a coil positioned outside the tire and secured to the vehicle, and the natural frequency of the passive oscillatory circuit is detected. The natural frequency of the coil/capacitor circuit is indicative of the pressure on the pressure-sensitive capacitor.

SUMMARY OF THE INVENTION

The present invention overcome the aforementioned problems and is distinguished over the prior art and these patents in particular by threshold calorimeter/shelf life monitors for placement in the environment of a perishable product prescribed to be maintained within a preferred storage temperature range for monitoring heat energy absorbed thereby over time and indicating the degree of deterioration based on a known time and temperature thermal deterioration profile of the perishable product. The monitors have a thermally modulating housing with a transparent portion or window that moderate heat energy conducted therethrough over time. A liquid solution contained in the housing and visible from the exterior has thermal conductivity and insulative properties that moderate heat energy conducted therethrough over time. A frangible arming capsule disposed in the solution contains a quantity of a low melting point/soluble solid material, including a coloring agent, having thermal conductivity, specific heat, melting point and/or solubility range, and heat of fusion properties, and a known surface area to be exposed to the solution. The thermal conductivity and specific heat of the housing material and liquid solution, the specific heat, melting point range and/or solubility range, heat of fusion, and heat of solution of the low melting point/soluble solid material, and its surface area to be exposed to the solution are calibrated relative to one another and function in mutual cooperation to absorb heat energy over time to closely match the known time and temperature thermal deterioration profile of the perishable product.

In an armed state, the arming capsule is broken or separated to expose the surface area of the low melting point/soluble solid material to the solution; and thereafter, the low melting point/soluble solid material melts or dissolves into the solution and/or forms an emulsion therein at a rate corresponding to the energy absorbed from the environment in which the monitor is located, and releases the coloring agent to produce a progressive gradual change in color of the solution over time to closely match the known time and temperature thermal deterioration profile of the perishable product and visually indicate the cumulative amount of heat energy absorbed in and above said preferred storage temperature range and whether, at any time, the temperature has been outside of the preferred storage temperature range for a period of time sufficient to cause any degree of deterioration based on the time and temperature thermal deterioration profile of the perishable product, or if a significant amount of shelf life has been consumed.

The low melting point/soluble solid material may also include additives such as electrical property (impedence) modifiers, dielectric constant modifiers, thermal conductivity modifiers, thermal energy storage capacity (heat of fusion and specific heat) modifiers, dissolution rate modifiers, and solvents. The liquid solution may also include chemicals such as water based liquids, solvents, dissolution rate modifiers, emulsifiers, stabilizers, dyes, chemical pH indicator dyes, freezing point modifiers, surfactants, acids, bases, electrical property (impedence) modifiers, dielectric constant modifiers, thermal conductivity modifiers, and thermal energy storage capacity modifiers.

Embodiments where either of the liquid solution or low melting point/soluble solid material have electrical properties that produce a progressive change in the dielectric constant or impedance of the solution may be used as an element in an electrical circuit to indicate both visually by a change in color of the solution, and electrically by a change in electrical capacitance and/or impedance, the cumulative amount of heat energy absorbed, thermal history, deterioration profile of the perishable product, or if a significant amount of shelf life has been consumed. They may also be connected with a radio frequency (RF) transponder and antenna to induce a resonant frequency in the RF resonant circuit in proportion to the change in impedance and/or dielectric constant of the liquid solution to indicates the condition of the perishable product both visually by a change in color, and electrically by an RF data signal to a remote location, and to identify the particular transmitting unit.

DESCRIPTION OF THE PREFERRED EMBODIMENTS

Figure 1:
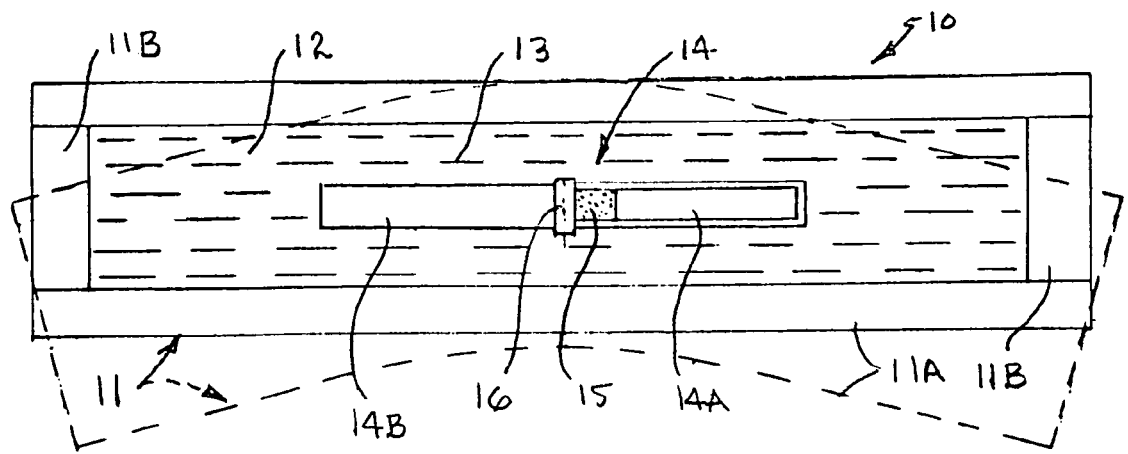
FIG. 1 is a cross sectional view showing, somewhat schematically, a threshold calorimeter/shelf life monitor in accordance with the present invention, in an unarmed state, and showing the housing being bent in dashed line.

Referring now to the drawings by numerals of reference, there is shown, somewhat schematically, in FIGS. 1-4, a preferred disposable embodiment of the threshold calorimeter/shelf life monitor 10. The monitor 10 has a housing 11 with a side wall 11A sealed at each end 11B defining a fluid sealed interior cavity 12 which contains a liquid solution 13. An arming capsule 14 is submerged or suspended within the liquid solution 13 in the cavity 12. The arming capsule 14 has a tubular casing 14A that contains a quantity of a low melting point/soluble solid material 15 and has an open end which is temporarily sealed by a closure member such as a rod-like plug or stopper 14B. It should be understood that several slugs of low melting point/soluble solid material 15 may be contained in the tubular casing 14A of the arming capsule 14, in radially spaced relation.

Figure 2:
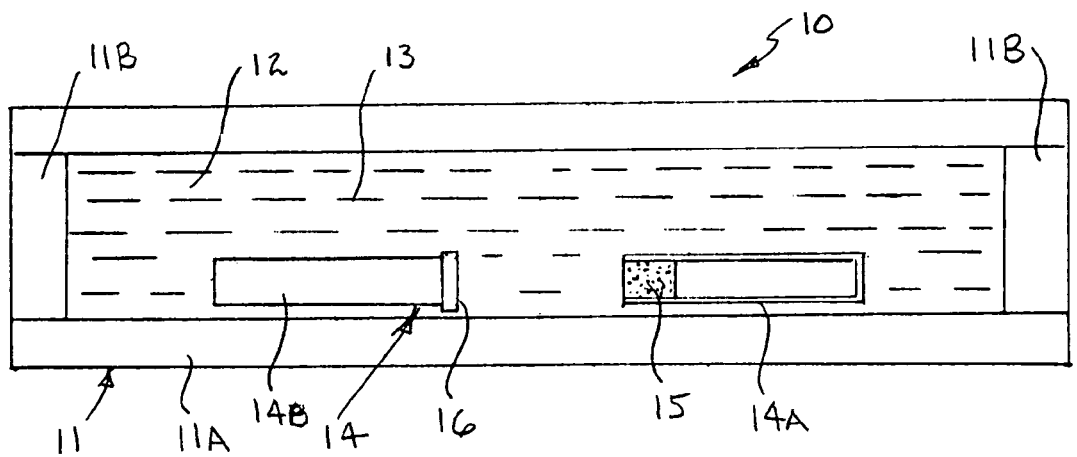
FIG. 2 is a cross sectional view showing the threshold calorimeter/shelf life monitor in an armed state.

In the unarmed condition (FIG. 1), the rod-like plug or stopper 14B is releasably affixed in a fluid sealed relation to the open end of the casing 14A by a frangible seal 16 such as a breakable adhesive or bonding agent, such that they will separate upon application of a sufficient bending force (FIG. 2). In the unarmed condition the low melting point/soluble solid material 15 is encapsulated and isolated from the liquid solution 13 by the rod-like plug or stopper 14B. To arm the device, the housing 11 is bent manually or otherwise to apply a bending force to the arming capsule 14. In addition to its arming function, the arming capsule 14 encapsulates and limits heat transfer to the low melting point/soluble solid material 15 on all surfaces other than the surface area that is exposed to the solution 13 when armed, as described hereinafter.

In a preferred embodiment, the housing 11 is formed of a clear or transparent flexible material such as elastomers, vinyl, PVC, acrylic, polystyrene or polycarbonate, such that the color of the solution 13 contained therein can be visually observed, and has the physical properties of a high specific heat, a relatively non-reactive (chemically) nature, a low thermal conductivity, high durability, and has a thermal capacity and insulative properties selected to moderate heat energy conducted therethrough over time. Alternatively, the housing may be formed of such a material that is not clear or transparent, but is provided with a clear or transparent window constructed of glass, plastic or elastomers, which will allow the color of the solution to be observed.

The low melting point/soluble solid material 15 contained in the arming capsule 14 can be any non-metallic solid, with a melting point between about −85° C. and about 110° C. The properties of a preferred low melting point/soluble solid material 15 are a high specific heat, a low toxicity, a non-reactive (chemically) nature, a low thermal conductivity and an easily adjustable and controllable melting point range. The low melting point/soluble solid material 15 has a coloring agent dispersed or dissolved therein, which may be a chemical pH indicator dye and an acid, a chemical pH indicator dye and a base, an acid, a base, or a conventional dye. The low melting point/soluble solid material 15 may also include other materials to modify the electrical properties of the low melting point/soluble solid material, reduce its thermal conductivity, increase its thermal energy storage capacity (heat of fusion and specific heat) and/or change its dissolution rate.

Mixtures of normal paraffins are suitable for use in the low melting point/soluble solid material(s) 15. The specific heat of normal paraffins is about 2.1 kJ/(kg·K). Their heat of fusion is about 200 kJ/kg, which is very high for organic materials. The combination of these two values results in an excellent energy storage density. Consequently, paraffins offer four to five times higher energy storage capacity by volume or mass, than water at low temperatures (1° C. to 99° C.). Like nearly all other organic materials, normal paraffins also have a low thermal conductivity (approx. 0.18 W/(m·K)). The only effective way to increase heat transfer in and out of a mixture of paraffins is to increase the surface area. Thus, it takes a significant amount of time for heat energy to enter into and cause finite melting in an object made of paraffin. The mixture of n-paraffins determines the maximum fractional amount of (melted) liquid paraffin on the surface of the low melting point/soluble solid material(s) that is exposed to the solution, with respect to temperature. By selecting the mixture of n-paraffins in the low melting point/soluble solid material, the rate of dissolution can be controlled with respect to temperature, and consequently, the low melting point/soluble solid material(s) 15 can be designed such that as it melts, the surface area exposed to the solution increases dramatically resulting in more of the dispersed/dissolved materials being released in the solution in less time.

A preferred liquid solution 13 is a mixture which may include solvents, dissolution rate modifiers, emulsifiers, stabilizers, dyes, chemical pH indicator dyes, chemicals for freezing point adjustment, acids and/or bases. The properties of a preferred solution 13 are a high specific heat, a low toxicity, a low thermal conductivity, a solvent for the materials dispersed in the low melting point/soluble solid, and an easily adjustable and controllable ability to dissolve and/or emulsify the low melting point/soluble solid material(s). The solvent dissolves and/or forms an emulsion with the low melting point/soluble solid materials(s) at a rate proportional to time and temperature. The dispersed/dissolved material(s) in the low melting point/soluble solid material(s) are released into the liquid solution 13 to produce a progressive graded change in the color of the solution. The progressive graded change in color of the solution is due to increased concentration of dye in the solution and/or a change in the chemical pH of the solution resulting in a color metamorphosis of a chemical indicator dye(s).

Examples of dissolution rate modifiers in the solution are the addition of an alcohol (soluble in low average molecular weight normal paraffins, marginally or not soluble in high average molecular weight normal paraffins) to a normal paraffin solution, wherein the low melting/soluble solid material comprises primarily higher average molecular weight normal paraffins, or the addition of a surfactant to a water based solution wherein the low melting point/soluble solid material comprises primarily low average molecular weight normal paraffins.

In the present threshold calorimeter/shelf life monitors 10, the following components are correlated relative to one another and calibrated to give an indication (color change) that closely relates to a thermal deterioration profile (i.e. time-temperature profile) of a perishable product:

The thermal conductivity and specific heat of the housing and solution;

The specific heat, melting point range, thermal conductivity and heat of fusion of the low melting point/soluble solid material(s);

Heat of solution of the low melting point point/soluble solid material(s);

The solubility range (in the solution) of the low melting point/soluble solid material(s) with respect to time and temperature;

Dielectric constant and electrical impedance of the low melting point point/soluble solid material(s) and solution; and Surface area of the low melting point point/soluble solid material(s) to be exposed to the solution.

Figure 7:
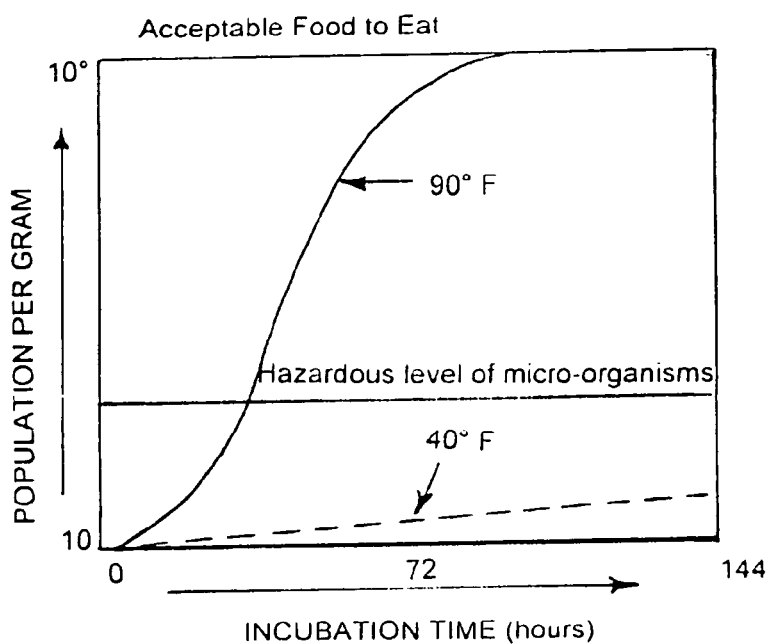
FIG. 7 is a chart illustrating a time-temperature-deterioration curve that may be used to design threshold calorimeter/shelf life monitors in accordance with the present invention having predetermined thermodynamic responses related to the deterioration curve of the product being monitored.
Figure 8:
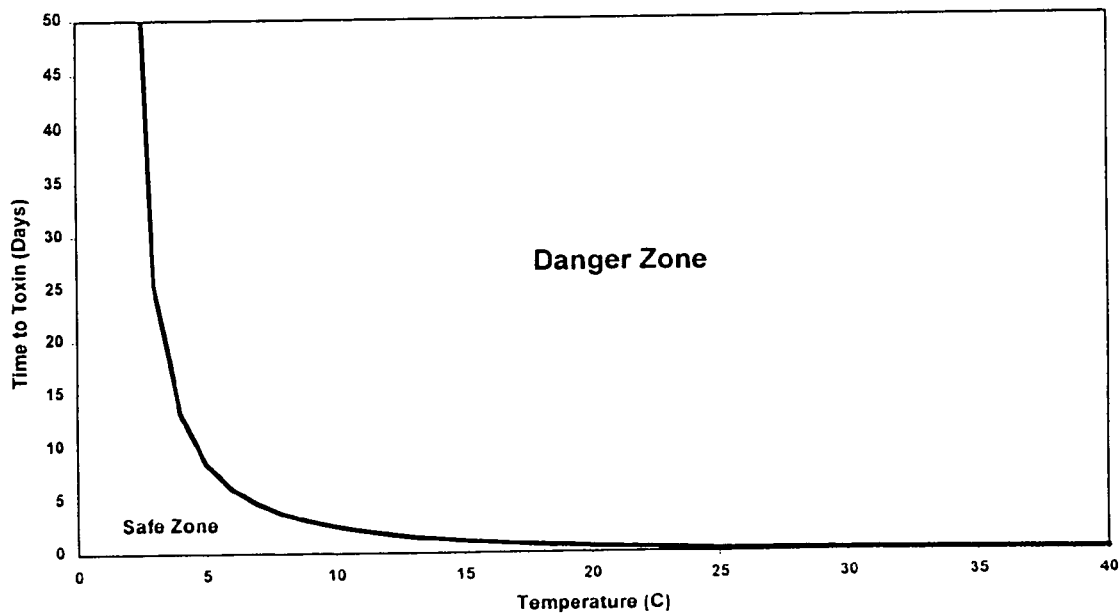
FIG. 8 is a chart illustrating the time-temperature-deterioration curve of white fish.

FIG. 7 is a graph illustrating a time-temperature-deterioration curve that may be used to design threshold calorimeter/shelf life monitors in accordance with the present invention having predetermined thermodynamic responses related to the deterioration curve of the product being monitored. FIG. 8 is a graph illustrating the time-temperature-deterioration curve of white fish, as an example of a food product that may be monitored.

Thus, when there is a progressive graded change in the color of the solution of the threshold calorimeter/shelf life monitor it is an indication of the amount of energy (heat) absorbed by the product being monitored due to exposure to detrimental temperatures for a significant period of time, or of the consumed useful life (used shelf life) corresponding to the thermal deterioration profile of the perishable product, while within the appropriate storage temperature range.

When the low melting point/soluble solid material(s) 15 dissolves, it forms an emulsion and/or melts in the liquid solution 13 due to the result of time and temperature, and the dispersed or dissolved material(s) are proportionately released into the solution to produce a progressive graded change in color of the solution. If part of the low melting point/soluble solid material(s) 15 melts, the surface area exposed to the liquid solution 13 increases dramatically resulting in more of the dispersed/dissolved materials being released in the solution in less time.

Figure 3:
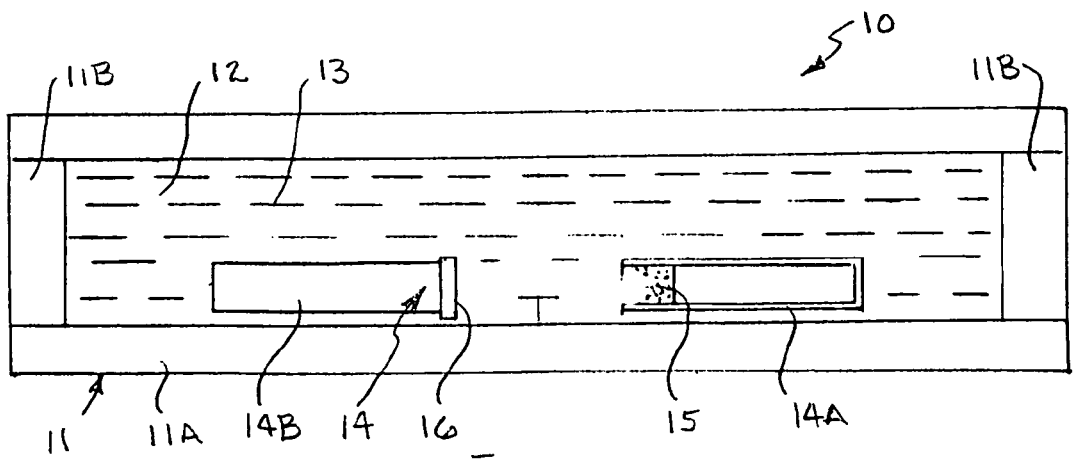
FIG. 3 is a cross sectional view showing the threshold calorimeter/shelf life monitor in an armed state responding to a time interval wherein the low melting point/soluble solid material is dissolving or being emulsified slowly at temperatures below the melting point range of the low melting point/soluble solid material.
Figure 4:
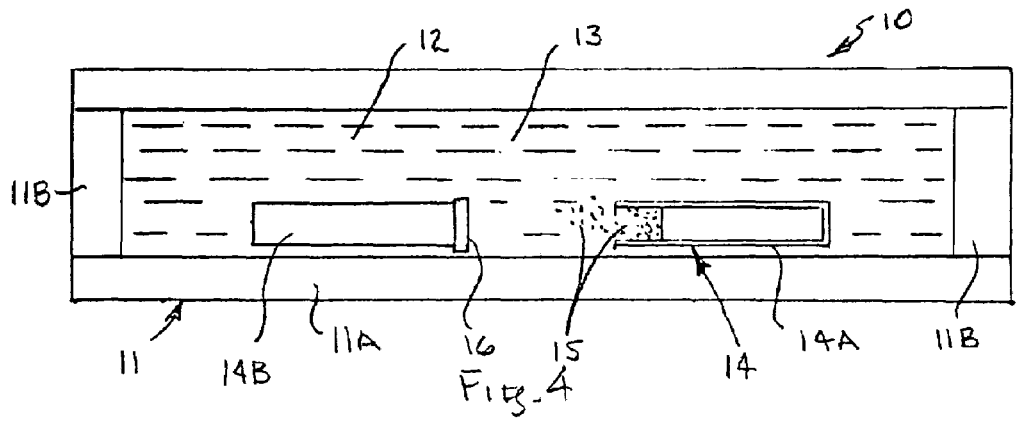
FIG. 4 is a cross sectional view showing the threshold calorimeter/shelf life monitor in an armed state responding to a time interval wherein the low melting point/soluble solid material is dissolving or being emulsified rapidly at temperatures in or above the melting point range of the low melting point/soluble solid material or because of increased surface area and temperature.

FIG. 3 shows, somewhat schematically the threshold calorimeter/shelf life monitor 10 in an armed state responding to a time interval wherein the low melting point/soluble solid material 15 is dissolving or being emulsified slowly at temperatures below the melting point range of the low melting point/soluble solid material. FIG. 4 shows threshold calorimeter/shelf life monitor 10 in an armed state responding to a time interval wherein the low melting point/soluble solid material 15 is dissolving or being emulsified rapidly at temperatures in or above the melting point range of the low melting point/soluble solid material or because of increased surface area and temperature.

As stated above, the low melting point/soluble solid material 15 may also include additives to modify the electrical properties of the low melting point/soluble solid material, thus, threshold calorimeter/shelf life monitors in accordance with the present invention can be produced that are capable of use as an element in an electric circuit wherein the electrical impedance of the monitor is proportional to the cumulative thermal energy it has absorbed (CE TCSLM). As shown somewhat schematically in FIG. 5, the monitor 10 is provided with electrodes 17 that extend sealingly through the housing 11 and into contact with the liquid solution 13 contained in the interior cavity 12 for measuring changes in impedance and or dielectric constant of the solution. The other ends of the electrodes 17 are connected to an electrical circuit 19 such that threshold calorimeter/shelf life monitor can act as an electronic sensor calibrated to closely match a thermal decay profile (time-temperature profile) of a perishable product being monitored and indicate, both visually by a change in color, and electrically by a change in electrical capacitance and/or impedance, the cumulative thermal energy it has absorbed and correspondingly the cumulative thermal history of the product while in transit or storage and whether its time-temperature profile has been violated to a detrimental extent or if a significant amount of shelf life has been consumed.

Figure 5:
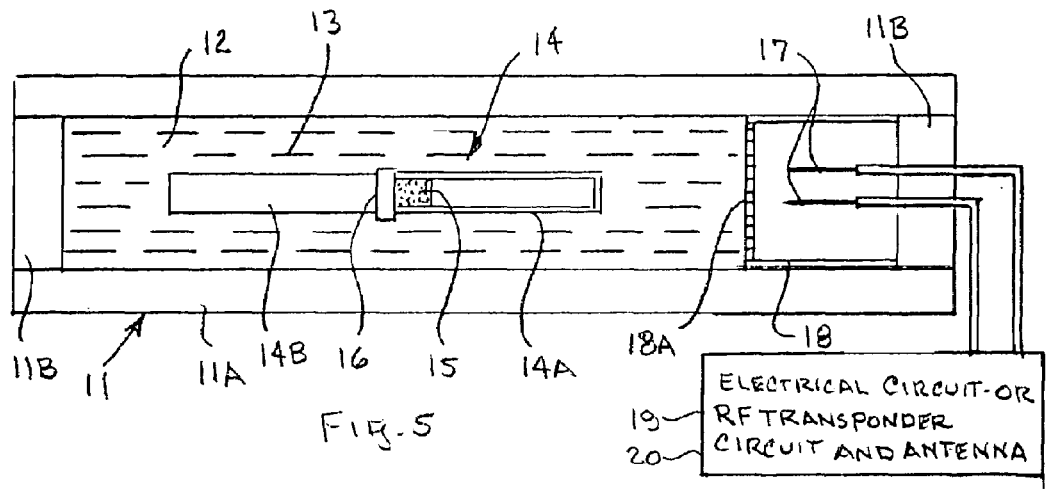
FIG. 5 is a cross sectional view showing, somewhat schematically, a modification of the threshold calorimeter/shelf life monitor in accordance with the present invention, in an unarmed state, and having electrodes connected with an electrical circuit or RF transponder circuit.
Figure 6:
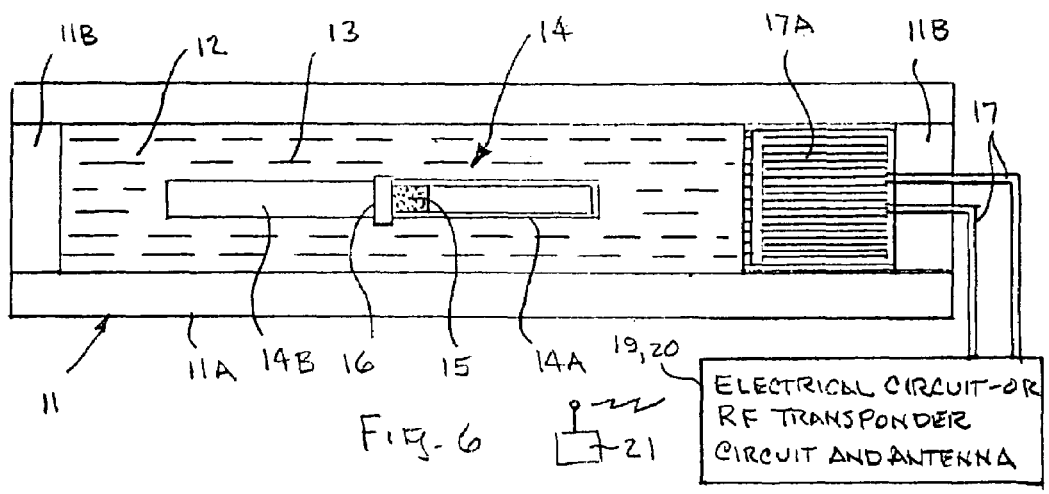
FIG. 6 is a cross sectional view showing, somewhat schematically, another modification of the threshold calorimeter/shelf life monitor in accordance with the present invention, in an unarmed state, and having capacitive foil electrodes rolled around an open celled spacer that allows the solution to freely move in and out.

In another modification, as shown in FIGS. 5 and 6, the threshold calorimeter/shelf life monitors 10 having a low melting point/soluble solid material 15 that include additives that modify its electrical properties can be produced that are capable of use as an element in a radio transponder circuit where it would alter or modulate a radio signal to indicate the cumulative thermal exposure history, and can be remotely read by a wireless radio frequency monitor. This embodiment of the threshold calorimeter/shelf life monitors (RF-TCSLM) can be calibrated to closely match a thermal decay profile (time-temperature profile) of a perishable product being monitored and indicate, not only visually by a change in color, but also transmit the identification and cumulative thermal exposure data with respect to the particular product being monitored by way of a radio frequency transponder and antenna.

As shown somewhat schematically in FIGS. 5 and 6, in this modification, electrodes 17 extend sealingly through the housing 11 and into contact with the liquid solution 13 contained in the interior cavity 12 for measuring changes in impedance and or dielectric constant of the solution. It should be understood that the physical configuration of the electrodes 17 is dependent on the nature of the circuit. As an example, in FIG. 5, the electrodes 17 are wire or ribbons having inward facing ends secured in a tubular housing 18 disposed in the interior cavity 12 which has a grid 18A to allow contact with the liquid solution 13 while preventing the components of the arming capsule 14 from interfering with the electrodes. In FIG. 6 the electrodes 17 are connected with foil plates of a rolled foil capacitor 17A with an open cell spacer between the foil plates to allow the solution to pass back and forth freely between the foil plates. The outer ends of the electrodes 17 are connected with a radio frequency transponder circuit 20 having an antenna. The radio frequency transponder circuit 20 is conventional and well known to those skilled in the art, and therefore not shown and described in detail.

Typically, the radio frequency transponder 20 includes conventional circuitry capable of receiving an incoming interrogation signal and responding thereto by generating and transmitting an outgoing responsive signal. The outgoing responsive signal is modulated or otherwise encoded so as to uniquely identify or label the particular object to which the transponder 20 is affixed or associated and is transmitted to an external or remote reader/interrogator 21, also conventional and well known to those skilled in the art, and therefore not shown. In a preferred embodiment, the transponder 20 is powered by an RF signal from the external or reader/interrogator 21.

When the dispersed/dissolved low melting point/soluble solid material(s) 15 are released into the solution 13, they produce a progressive change in the impedance and/or dielectric constant of the solution with respect to thermal exposure of the device. The changes in impedance and or dielectric constant of the solution are read by the electrodes 17 and conveyed to the radio frequency (RF) transponder 20 and transmitted to the external or remote reader/interrogator 21, in the form of data, in a data stream on a signal which is output by the transponder, such as by modulating the data stream onto a RF signal transmitted by the transponder to the external reader/interrogator. The cumulative thermal history and/or the identity information may also be used to alter the amplitude, frequency, phase, timing or a combination of the above to modulate the RF signal.

Examples of RF transponder or transceiver type identification and reader/interrogator systems suitable for use in the present invention are shown and described in U.S. Pat. RE 37,956; U.S. Pat. No. 5,712,609; U.S. Pat. No. 5,661,651; U.S. Pat. No. 5,451,959; U.S. Pat. No. 4,911,217; U.S. Pat. No. 4,857,893; and U.S. Pat. No. 4,578,992; which are hereby incorporated by reference in their entirety to the same extent as if fully set forth herein. This incorporation-by-reference is for the purpose of simplifying the drawings and descriptions of the present invention and, also for the purpose of providing a clear and concise description of this invention. The reader may refer to the above patents for a more detailed description of particular components of the RF transponder or transceiver type identification and reader/interrogator system.

As shown in FIG. 1, to arm the threshold calorimeter/shelf life monitors 10, the housing 11 is bent to apply a bending force on the arming capsule 14 until the rod-like plug or stopper 14B and the casing 14A receiver break free from each other or separate and expose part of the surface of the low melting point/soluble solid material(s) 15 to the solution 13. From this point on, the process of dissolving of the low melting point/soluble solid material(s) into the solution will continue at a rate corresponding to the energy absorbed from the environment in which the monitor is located. As the low melting point/soluble solid material(s) melt or dissolve it releases dissolved/entrained dyes and/or chemicals that produce a progressive graded change in color of the solution, or cause a change in the dielectric constant and impedance of the solution. The rate at which energy is absorbed is moderated by the combined thermal properties of the housing 11, the solution 13 and the low melting point/soluble solid material(s) 15. This moderation is calibrated to produce a delayed response that closely mimics or closely relates to the thermal deterioration profile (i.e. time-temperature profile) of the perishable product.

If the threshold calorimeter/shelf life monitors are placed in an environment where they are exposed to detrimental temperatures within or above the melting point range of one of the low melting point/soluble solid material(s) for a significant period of time, the exposed surface of the low melting point/soluble solid material(s) will begin melting and drastically increase the rate in which it is dissolved/emulsified due to increased surface area and available energy (FIG. 4). This will result in a more rapid color change in the solution and shift in the dielectric constant and impedance.

EXAMPLES OF USE

FIG. 7 is a graph illustrating the time-temperature rate of growth of a hazardous level of microorganisms of a food product and FIG. 8 is a graph illustrating the time-temperature-deterioration curve of white fish, as an example of a food product that may be monitored. The following scenarios illustrate examples of how the present threshold calorimeter/shelf life monitors 10 may be used.

Example 1

A seafood wholesaler ships large volumes of white fish, which decays in accordance with the time-temperature curve seen in FIG. 7, via an independent trucking company. The fish is packaged in boxes each containing 20 one-pound consumer size packages. A typical shipment consists of 50 boxes (1000 lbs). The shipments are typically from the warehouse to a restaurant or supermarket. The restaurants or supermarkets are busy, and the delivery truck has to deliver to several of them. The boxes of fish are sometimes left on the loading dock for a time until the restaurant or supermarket employees have time to rearrange the freezer and put the fish away.

Obviously, the boxes of fish sitting on the loading dock of the restaurant or supermarket are exposed to ambient temperature. If allowed to sit on the loading dock for a significant period of time the fish would spoil. However, a short stay on the loading dock does not endanger the freshness of the fish.

A threshold calorimeter/shelf life monitor would be attached to each one-pound package of fish after it is initially cooled down at the wholesaler's warehouse or on the boat. At the time the fish is prepared for shipment the monitor would be armed manually or by a machine. The monitor provides a way to be certain that during the entire transport and/or storage process the fish was never subjected to detrimental prolonged elevated temperature at any point along the way. At any point in the process, the thermal exposure status can be checked by a worker that opens the box and observes the color displayed by the monitor. In the event that, during transport or storage, the fish was exposed to a temperature above the selected threshold temperature; and held above that temperature for a period long enough to cause significant deterioration, the solution in the monitor would change in color corresponding to that degree of deterioration. On receipt, an inspector, worker or consumer at a glance could determine if conditions existed where a dangerous degree of spoilage may have occurred.

Example 2

In the same scenario described above, the threshold calorimeter/shelf life monitors having additives that modify its electrical properties and equipped with the radio transponder circuit (RF-TCSLM) 20 are used (FIGS. 5 and 6). At the time the fish is prepared for shipment the RF-TCSLM would be cold soaked (exposed to a temperature for a sufficient time for the entire device to be uniform at the exposure temperature), and armed (automatically or manually), and attached to each box of fish. At any point in the transport/storage process, the thermal exposure status can be checked by a worker that opens the box and observes the color of the device, or more conveniently, the thermal exposure status can be checked remotely by a worker with a RF reader/interrogator 21 which does not require opening of the box or visual inspection of the monitor. In the event that, during transport or storage, the fish was exposed to a temperature above the selected threshold temperature; and held above that temperature for a period long enough to cause significant deterioration, the color and impedance of the solution in the RF-TCSLM would shift corresponding to that degree of deterioration. Upon receipt, an inspector or worker visually or remotely with a RF reader/interrogator 21 could determine (at a glance) if conditions existed where a dangerous degree of spoilage may have occurred.

Example 3

In a different example, the threshold calorimeter/shelf life monitors (CE-TCSLM) having additives that modify its electrical impedance properties to be proportional to the cumulative thermal energy it has absorbed and employed as element in an electric circuit 19 may be used to sense potential damage to sensitive electronics, and trigger a warning circuit or to provide a low cost means of determining the total thermal energy passing thru a given point such as a heat sink, ice chest or other thermal barrier. The CE-TCSLM could be read by any of several conventional means used to determine the impedance of circuit elements.

While this invention has been described fully and completely with special emphasis upon a preferred embodiment, it should be understood that within the scope of the appended claims the invention may be practiced otherwise than as specifically described herein.

The invention claimed is:

1. A threshold calorimeter/shelf life monitor for placement in the environment of a perishable product prescribed to be maintained within a preferred storage temperature range for monitoring heat energy absorbed thereby over time and indicating the degree of deterioration based on a known time and temperature thermal deterioration profile of the perishable product, comprising:

a thermally-conductive housing having a fluid sealed interior cavity and a transparent portion, said housing formed of a material having thermal conductivity and insulative properties which moderate heat energy conducted therethrough over time;

a liquid solution contained in said fluid sealed interior cavity and visible through said transparent portion, said liquid solution having thermal conductivity and insulative properties which moderate heat energy conducted therethrough over time;

a frangible or breakable arming capsule disposed in said liquid solution containing a quantity of a low melting point/soluble solid material having thermal conductivity, specific heat, melting point and/or solubility range, and heat of fusion properties;

said low melting point/soluble solid material having a known surface area to be exposed to said liquid solution and including a coloring agent dispersed or dissolved therein selected from the group consisting of a chemical pH indicator dye and an acid, a chemical pH indicator dye and a base, an acid, a base, and a conventional dye;

said thermal conductivity and specific heat of said housing material and said liquid solution, said specific heat, melting point range and/or solubility range, heat of fusion, and heat of solution of said low melting point/soluble solid material, and said surface area of said low melting point/soluble solid material to be exposed to said liquid solution calibrated relative to one another and functioning in mutual cooperation to absorb heat energy over time to closely match the known time and temperature thermal deterioration profile of the perishable product;

in an unarmed condition, said low melting point/soluble solid material being encapsulated and isolated from said liquid solution by said arming capsule, and in an armed condition, said arming capsule being broken to expose said surface area of said low melting point/soluble solid material to said liquid solution; and thereafter said low melting point/soluble solid material melts or dissolves into said liquid solution and/or forms an emulsion therein at a rate corresponding to the energy absorbed from the environment in which the monitor is located, and releases said coloring agent to produce a progressive gradual change in color of the solution over time to closely match the known time and temperature thermal deterioration profile of the perishable product and visually indicate the cumulative amount of heat energy absorbed in and above said preferred storage temperature range and whether, at any time, the temperature has been outside of said preferred storage temperature range for a period of time sufficient to cause any degree of deterioration based on the time and temperature thermal deterioration profile of the perishable product, or if a significant amount of shelf life has been consumed.

2. The threshold calorimeter/shelf life monitor according to claim 1, wherein
said housing is resiliently flexible to allow bending thereof; and
said arming capsule is broken or separated upon application of a sufficient bending force when said housing is bent.

3. The threshold calorimeter/shelf life monitor according to claim 1, wherein
said housing is formed of clear or transparent material.

4. The threshold calorimeter/shelf life monitor according to claim 1, wherein
said housing is formed of materials selected from the group consisting of elastomers, vinyl, PVC, acrylic, polystyrene, and polycarbonate.

5. The threshold calorimeter/shelf life monitor according to claim 1, wherein
said housing transparent portion comprises a clear or transparent window.

6. The threshold calorimeter/shelf life monitor according to claim 1, wherein
said low melting point/soluble solid material has a melting point between about −85° C. and about 110° C.

7. The threshold calorimeter/shelf life monitor according to claim 1, wherein
said low melting point/soluble solid material further comprises additives selected from the group consisting of electrical property (impedance) modifiers, dielectric constant modifiers, thermal conductivity modifiers, thermal energy storage capacity (heat of fusion and specific heat) modifiers, dissolution rate modifiers, and solvents.

8. The threshold calorimeter/shelf life monitor according to claim 1, wherein
said low melting point/soluble solid material comprises a mixture containing paraffin.

9. The threshold calorimeter/shelf life monitor according to claim 1, wherein
said liquid solution comprises a mixture containing chemicals selected from the group consisting of water based liquids, solvents, dissolution rate modifiers, emulsifiers, stabilizers, dyes, chemical pH indicator dyes, freezing point modifiers, surfactants, acids, bases, electrical property (impedance) modifiers, dielectric constant modifiers, thermal conductivity modifiers, and thermal energy storage capacity modifiers.

10. The threshold calorimeter/shelf life monitor according to claim 1, wherein
either of said liquid solution or said low melting point/soluble solid material have electrical properties that produce a progressive change in the dielectric constant or impedance of said liquid solution calibrated relative to the properties of said housing material and said surface area of said low melting point/soluble solid material to be exposed to said liquid solution as recited in claim 1 and functioning in mutual cooperation therewith to absorb heat energy over time to closely match the known time and temperature thermal deterioration profile of the perishable product; and further comprising:

electrodes extending sealingly through said housing having a first ends in contact with said liquid solution for measuring changes in impedance and/or dielectric constant of said liquid solution and second ends connected with an electrical circuit; wherein said threshold calorimeter/shelf life monitor is used as an element in the electrical circuit wherein the electrical impedance of the monitor is proportional to the cumulative thermal energy it has absorbed; and said threshold calorimeter/shelf life monitor indicates both visually by a change in color of said solution, and electrically by a change in electrical capacitance and/or impedance, the cumulative amount of heat energy absorbed in and above said preferred storage temperature range and whether, at any time, the temperature has been outside of said preferred storage temperature range for a period of time sufficient to cause any degree of deterioration based on the time and temperature thermal deterioration profile of the perishable product, or if a significant amount of shelf life has been consumed.

11. The threshold calorimeter/shelf life monitor according to claim 10, wherein said radio frequency (RF) resonant circuit is a transponder that transmits data representing the cumulative amount of heat energy absorbed in and above said preferred storage temperature range and whether, at any time, the temperature has been above said preferred storage temperature range for a period of time sufficient to cause any degree of deterioration based on the time and temperature thermal deterioration profile of the perishable product.

12. The threshold calorimeter/shelf life monitor according to claim 11, further comprising:

radio frequency (RF) reader/interrogator means that stimulates and receives a reply from said radio frequency (RF) circuit and records or displays said data.

13. The threshold calorimeter/shelf life monitor according to claim 12, wherein said transponder and said radio frequency (RF) reader/interrogator utilizes a unique code to uniquely identify a series of said threshold calorimeter/shelf life monitors.

14. The threshold calorimeter/shelf life monitor according to claim 1, wherein either of said liquid solution or said low melting point/soluble solid material have electrical properties that produce a progressive change in the dielectric constant or impedance of said liquid solution calibrated relative to the properties of said housing material and said surface area of said low melting point/soluble solid material to be exposed to said liquid solution as recited in claim 1 and functioning in mutual cooperation therewith to absorb heat energy over time to closely match the known time and temperature thermal deterioration profile of the perishable product; and further comprising:

electrodes extending sealingly through said housing having a first ends in contact with said liquid solution for measuring changes in impedance and/or dielectric constant of said liquid solution; and a radio frequency (RF) resonant circuit connected with second ends of said electrodes;

wherein a resonant frequency is induced in said resonant circuit in proportion to the change in impedance and/or dielectric constant of said liquid solution; and said threshold calorimeter/shelf life monitor indicates both visually by a change in color of said solution, and electrically by a radio signal to indicate the cumulative amount of heat energy absorbed in and above said preferred storage temperature range and whether, at any time, the temperature has been outside of said preferred storage temperature range for a period of time sufficient to cause any degree of deterioration based on the time and temperature thermal deterioration profile of the perishable product, or if a significant amount of shelf life has been consumed.

* * * * *